United States Patent
Barsun et al.

(10) Patent No.: US 8,230,850 B2
(45) Date of Patent: *Jul. 31, 2012

(54) TORQUE ARM ASSEMBLY AND METHOD

(75) Inventors: Stephan K. Barsun, Davis, CA (US);
Brian Wares, Sacramento, CA (US);
Charles Almy, Berkeley, CA (US);
Reuben Sandler, Berkeley, CA (US);
Nathaniel Schiesher, Berkeley, CA (US); Jason Maxey, San Pablo, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/044,047

(22) Filed: Mar. 9, 2011

(65) Prior Publication Data
US 2011/0155120 A1 Jun. 30, 2011

Related U.S. Application Data

(63) Continuation of application No. 12/364,376, filed on Feb. 2, 2009, now Pat. No. 7,958,886.

(51) Int. Cl.
*F24J 2/10* (2006.01)
(52) U.S. Cl. .......................... 126/600; 126/696
(58) Field of Classification Search ............. 126/600, 126/696; 29/525.14, 890.33, 434, 525.13, 29/426.1, 525.01; 403/66, 67, 68, 69, 70, 403/71, 395; 224/901; 156/60; 228/262, 228/141.1; 148/516; 470/2, 13
See application file for complete search history.

(56) References Cited

U.S. PATENT DOCUMENTS

| | | | | |
|---|---|---|---|---|
| 3,484,068 A | * | 12/1969 | Yoder | 248/158 |
| 3,535,751 A | * | 10/1970 | Batchelor | 403/395 |
| 4,108,154 A | | 8/1978 | Nelson | |
| 4,172,578 A | | 10/1979 | Pate | |
| 4,890,959 A | * | 1/1990 | Robishaw et al. | 405/204 |
| 6,058,930 A | | 5/2000 | Shingleton | |
| 6,105,907 A | * | 8/2000 | Komsitsky | 248/71 |
| 6,309,132 B1 | * | 10/2001 | Jakob et al. | 403/200 |
| 6,457,224 B1 | * | 10/2002 | Kanjanavikat | 29/464 |
| 6,722,357 B2 | * | 4/2004 | Shingleton | 126/600 |
| 6,889,943 B2 | | 5/2005 | Dinh et al. | |
| 7,435,134 B2 | | 10/2008 | Lenox | |
| 7,614,134 B2 | * | 11/2009 | Messein et al. | 29/525 |
| 2004/0238025 A1 | | 12/2004 | Shingleton | |
| 2008/0245360 A1 | * | 10/2008 | Almy et al. | 126/600 |
| 2008/0308142 A1 | * | 12/2008 | Grip et al. | 136/251 |

OTHER PUBLICATIONS

Shugar, Dan S., et al.; "Design and Prototype of a Minimal Cost Tracking Photovoltaic Array Structure;" Proceedings of the American Solar Energy Society Conference, Solar '95, Minneapolis, MN; Jul. 1995; 6 pgs.

* cited by examiner

*Primary Examiner* — Alfred Basichas
(74) *Attorney, Agent, or Firm* — Knobbe, Martens, Olson & Bear LLP

(57) ABSTRACT

A torque arm assembly, used with a solar collector mounted to a drive shaft, comprises a torque arm with first and second ends and a torque arm coupling assembly including a drive shaft enclosure defining an open-ended channel sized to house the drive shaft. The channel has a circumferentially extending substantially continuous drive surface between the ends that lies adjacent to the drive shaft so the drive shaft and the drive shaft enclosure rotate together. In some examples, contiguous abutment structure, such as weld lines, shims and/or adhesive, connects each side of the drive shaft to the drive shaft enclosure. The invention may also be carried out as a connection improvement method.

20 Claims, 5 Drawing Sheets

TORQUE ARM ASSEMBLY AND METHOD

CROSS REFERENCE TO OTHER APPLICATIONS

This application is a continuation of U.S. patent application Ser. No. 12/364,376 filed on 2 Feb. 2009.

FEDERALLY SPONSORED RESEARCH OR DEVELOPMENT

None.

BACKGROUND OF THE INVENTION

This invention relates to solar energy collection, and in particular to the attachment of torque arms to the drive shafts (or torque tubes) used to tilt solar collectors about a pivot axis so that the solar collectors can track the motion of the sun relative to the earth.

In general terms, solar collector installations have an array of solar collector assemblies including solar collectors, also called solar collector modules, supported above a support surface, typically the ground. The solar collectors are typically photovoltaic solar collectors. The solar collectors are often mounted to the drive shaft by frame or other support members. The drive shaft, sometimes referred to as a torque tube or torque member, defines a pivot axis. A tracker drive system, also called a tilt assembly, is typically used to rotate or rock the rows of solar collector assemblies about their tilt axes to keep the photovoltaic modules as square to the sun as possible. Usually, the rows are arranged with the tilt axes of the solar collector assemblies disposed in a north-south direction, and the tilt assemblies gradually rotate the one or more rows of solar collector assemblies throughout the day from an east-facing direction in the morning to a west-facing direction in the afternoon. The solar collector assemblies are brought back to the east-facing orientation for the next day.

BRIEF SUMMARY OF THE INVENTION

A torque arm assembly is used with a solar collector installation of the type comprising a solar collector mounted to a drive shaft, the drive shaft having sides defining an outer surface. The torque arm assembly comprises a torque arm and a torque arm coupling assembly. The torque arm has first and second ends. The torque arm coupling assembly comprises a first part and a second part securable to the first part to define a drive shaft enclosure. The drive shaft enclosure is secured to the first end of the torque arm. The drive shaft enclosure defines an open-ended channel sized to house a drive shaft. The channel has first and second open ends with a circumferentially extending substantially continuous drive surface therebetween. The drive surface is sized and shaped to lie adjacent to the outer surface of the drive shaft so the drive shaft and the drive shaft enclosure rotate together. In some examples a contiguous abutment structure connects each side of the drive shaft to the drive shaft enclosure. The contiguous abutment structure may comprise one or more of the following: (1) weld lines placeable along portions of the drive shaft enclosure and the drive shaft; (2) shims located between the drive shaft enclosure and the drive shaft; and (3) an adhesive located between the drive shaft enclosure and the drive shaft.

A torque drive assembly is used as a part of a solar collector assembly of the type comprising a solar collector. The torque drive assembly comprises a drive shaft, a torque arm and a torque arm coupling assembly. The solar collector is secured to the drive shaft. The drive shaft has sides defining an outer surface. The torque arm has first and second ends. The torque arm coupling assembly has first and second parts. The second part is securable to the first part to define a drive shaft enclosure. The drive shaft enclosure is secured to the first end of the torque arm. The drive shaft enclosure defines an open-ended channel sized to house the drive shaft. The channel has first and second open ends with a circumferentially extending substantially continuous drive surface therebetween. The drive surface is sized and shaped to lie adjacent to the outer surface of the drive shaft and is fixedly connected to the drive shaft so that the drive shaft and the drive shaft enclosure rotate together.

A connection improvement method is used with a solar collector installation of the type comprising a solar collector mounted to a drive shaft, the drive shaft having an outer surface. The installation also includes a torque arm having first and second ends and a mounting plate at the first end securable to the drive shaft by removable mounting hardware. The method improving the connection between the mounting plate and the drive shaft comprises the following steps. Any mounting hardware connecting the mounting plate to the drive shaft is removed. A U-bracket is placed over the drive shaft in alignment with the mounting plate so the U-bracket and mounting plate define a drive shaft enclosure. The drive shaft enclosure defines an open-ended channel sized to house the drive shaft. The channel has first and second open ends with a circumferentially extending substantially continuous drive surface therebetween. The drive surface is sized and shaped to lie adjacent to the outer surface of the drive shaft. The U-bracket is secured to the mounting plate. Contiguous abutment structure is provided to connect the drive shaft enclosure and each side of the drive shaft.

Other features, aspects and advantages of the present invention can be seen on review of the figures, the detailed description, and the claims which follow.

DESCRIPTION OF THE SPECIFIC EMBODIMENTS

Figure 1:
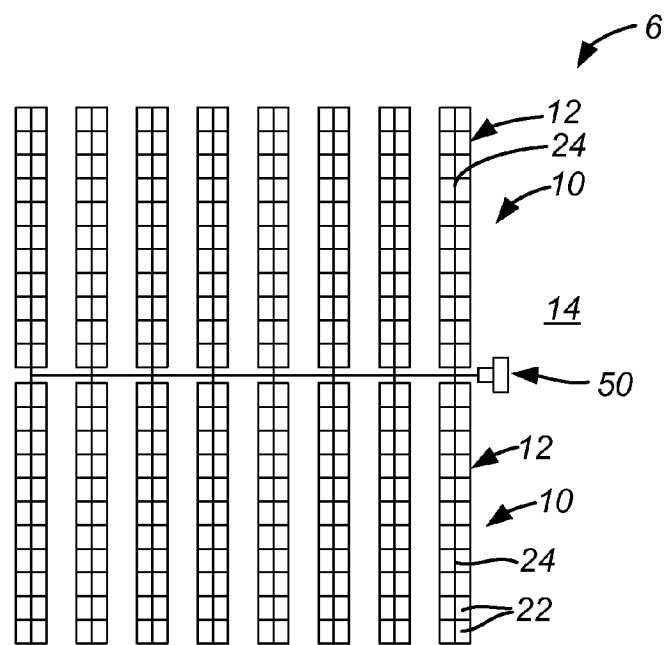
FIG. 1 is a top plan view of an array of solar collector assemblies made according to the invention.

The following description will typically be with reference to specific structural embodiments and methods. It is to be understood that there is no intention to limit the invention to the specifically disclosed embodiments and methods but that the invention may be practiced using other features, elements, methods and embodiments. Possible embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 2:
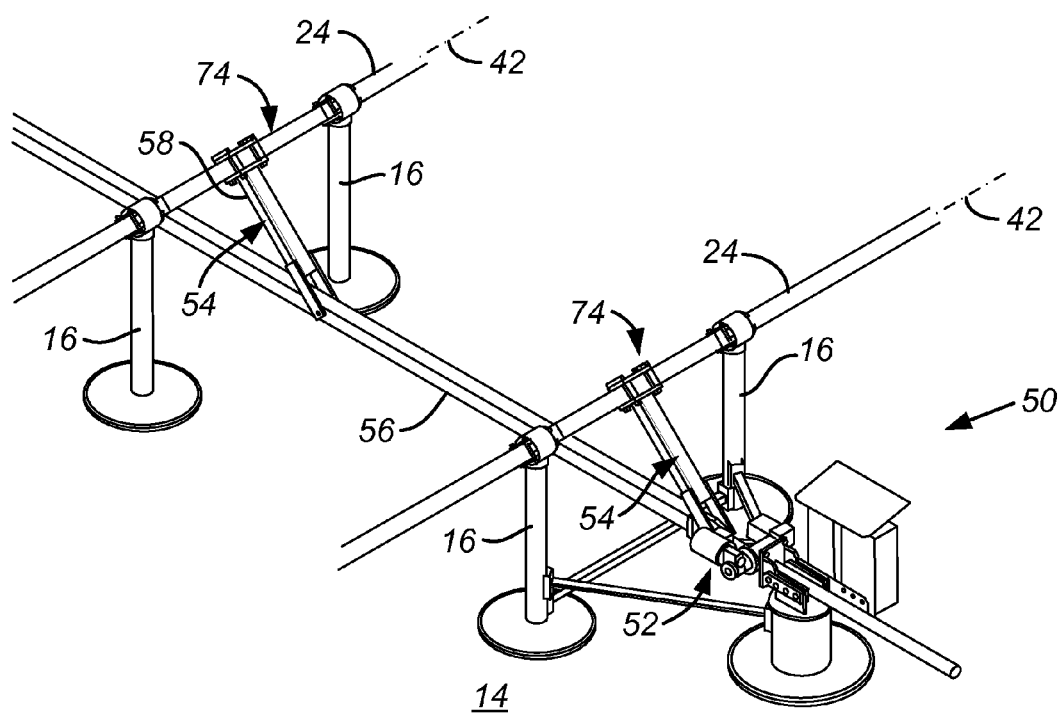
FIG. 2 as a top, front, right side view of a portion of the array of FIG. 1 with the solar collectors removed to show the underlying structure.

FIGS. 1 and 2 illustrate an array 6 of solar collector assemblies 10. Each solar collector assembly 10 includes broadly a solar collector module assembly 12 mounted above a support surface 14, typically the ground, by a row of supports 16. Solar collector module assembly 12 includes a number of solar collectors 22 supported by a generally North-South oriented drive shaft 24, sometimes referred to as a torque tube. Solar collectors 22 can be mounted directly to drive shaft 24 or through intermediate support elements, such as transversely oriented rails that are rigidly secured to drive shaft 24 with the solar collectors 22 secured to the rails by clips or other mounting structure appropriate to the construction of the solar collector modules. See, for example, U.S. Pat. No. 6,722,357 which shows transversely oriented rails rigidly secured to a square torsion tube. An example of clips suitable for use with solar collector modules 22 having a peripheral frame is disclosed in U.S. Pat. No. 7,435,134.

Each solar collector module assembly 12 is rotated about a pivot axis 42, thus allowing the assembly to follow the movement of the sun during the day, by a tilt assembly 50. Tilt assembly 50 includes a driver 52 connected by a drive strut 56 to torque arms 54 extending from drive shafts 24. The inner end 58 of each torque arm 54 is secured to drive shaft 24 and may extend from the drive shaft generally perpendicular to a plane defined by solar collector modules 22. Examples of tilt assemblies 50 are shown in U.S. Pat. No. 6,058,930 and U.S. patent publication Nos. U.S. 2004/0238025 and U.S. 2008/0245360.

U.S. patent publication No. U.S. 2008/0245360 shows the use of mounting plates extending from the inner end 58 of torque arm 54 and bolting those mounting plates to the sides of drive shaft 24. This type of connection can be sufficiently strong for the type of solar collector assemblies disclosed in the publication. However, solar collector installation 6 employs relatively long rows solar collector assemblies 10, each of the rows of solar collector assemblies 10 rotated by a single tilt assembly 50. In this situation much greater forces are exerted between the drive shaft 24 and the torque arm 54 because many more solar collectors 22 are typically mounted to a single drive shaft 24 than is found with the installation of U.S. patent publication No. U.S. 2008/0245360. To accommodate these longer rows of solar collectors, the mounting plates can be welded to the sides of drive shaft 24. However, this requires a great deal of welding which is expensive in terms of the cost of the joint itself and also because this welding, done in the field, slows down installation and often disrupts scheduling of other installation procedures.

Figure 3:
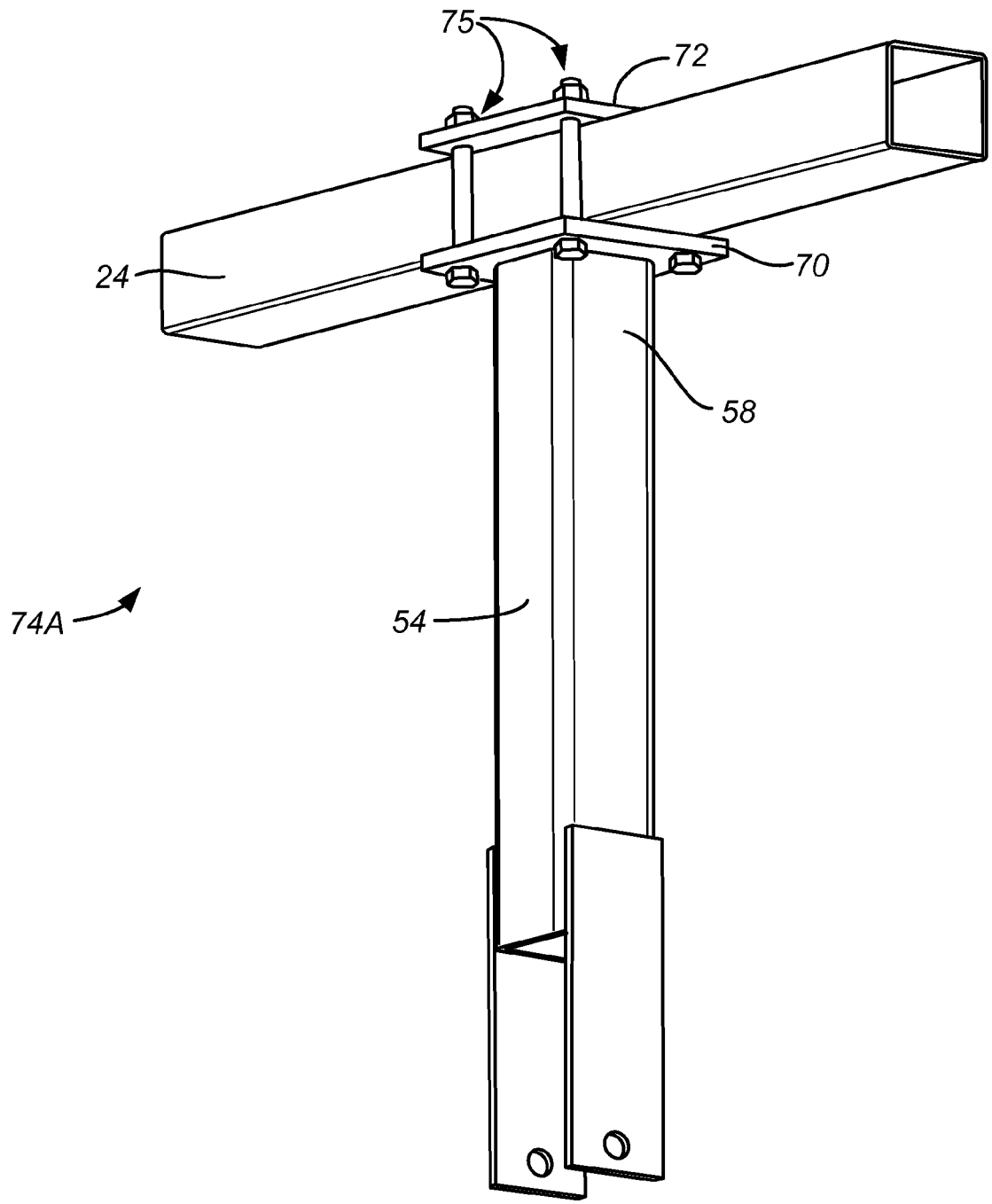
FIG. 3 shows a conventional bolted joint torque arm assembly.

FIG. 3 illustrates a conventional, prior art bolted joint torque arm assembly 74A designed to accommodate the higher forces commonly encountered when driving longer rows of solar collectors. This bolted joint design has a plate 70 welded to the inner end 58 of a torque arm 54. A top plate 72 is bolted to plate 70 using 4 sets of nut and bolt fasteners 75. Although this design is efficiently installed in the field, during some high loading conditions, in particular in high wind conditions, some of the joints between torque arm 54 and drive shaft 24 may fail. This failure is typically limited to the 3 outermost rows of solar collector assemblies. Interior rows are typically sufficiently shielded by the outermost rows so as not to be subjected to the same level as forces as the outermost rows.

Figure 4:
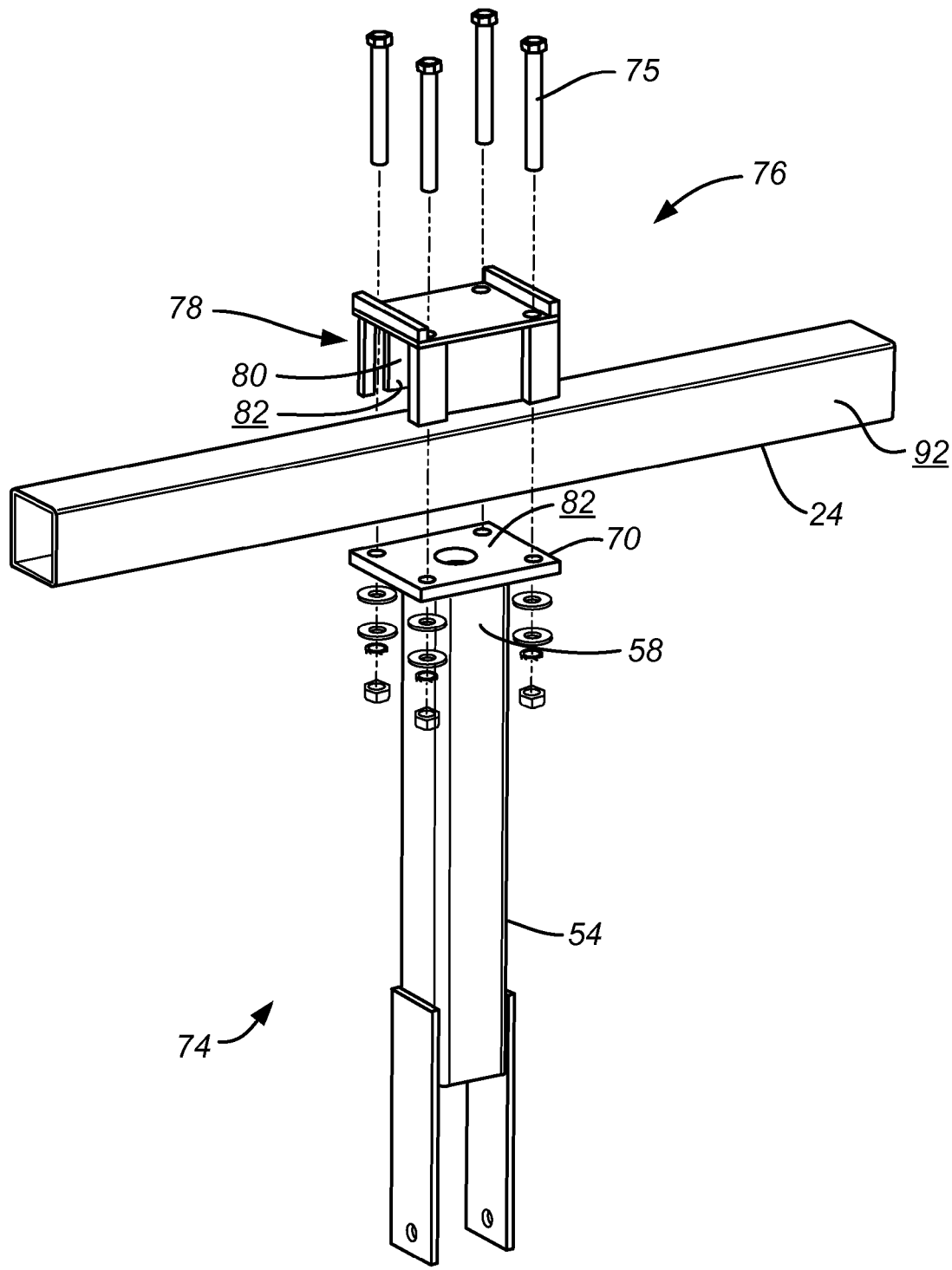
FIG. 4 is an exploded isometric view of the torque arm assembly of FIG. 2.

FIG. 4 shows an exploded isometric assembly view of the torque arm assembly 74 of FIG. 2, made according to the invention and designed to address strength shortcomings of the torque arm assembly 74A of FIG. 3. Assembly 74 includes torque arm 54 and a torque arm coupler assembly 76. Assembly 76 includes plate 70 and a U-bracket 78 secured to plate 70 by fasteners 75. U-bracket 78 and plate 70 of assembly 76 act as a drive shaft enclosure 79 and define an open-ended channel 80 sized to house drive shaft 24. Channel 80 has open ends and defines a circumferentially extending drive surface 82 extending between the open ends to completely surround all four sides of drive shaft 24.

Figure 5:
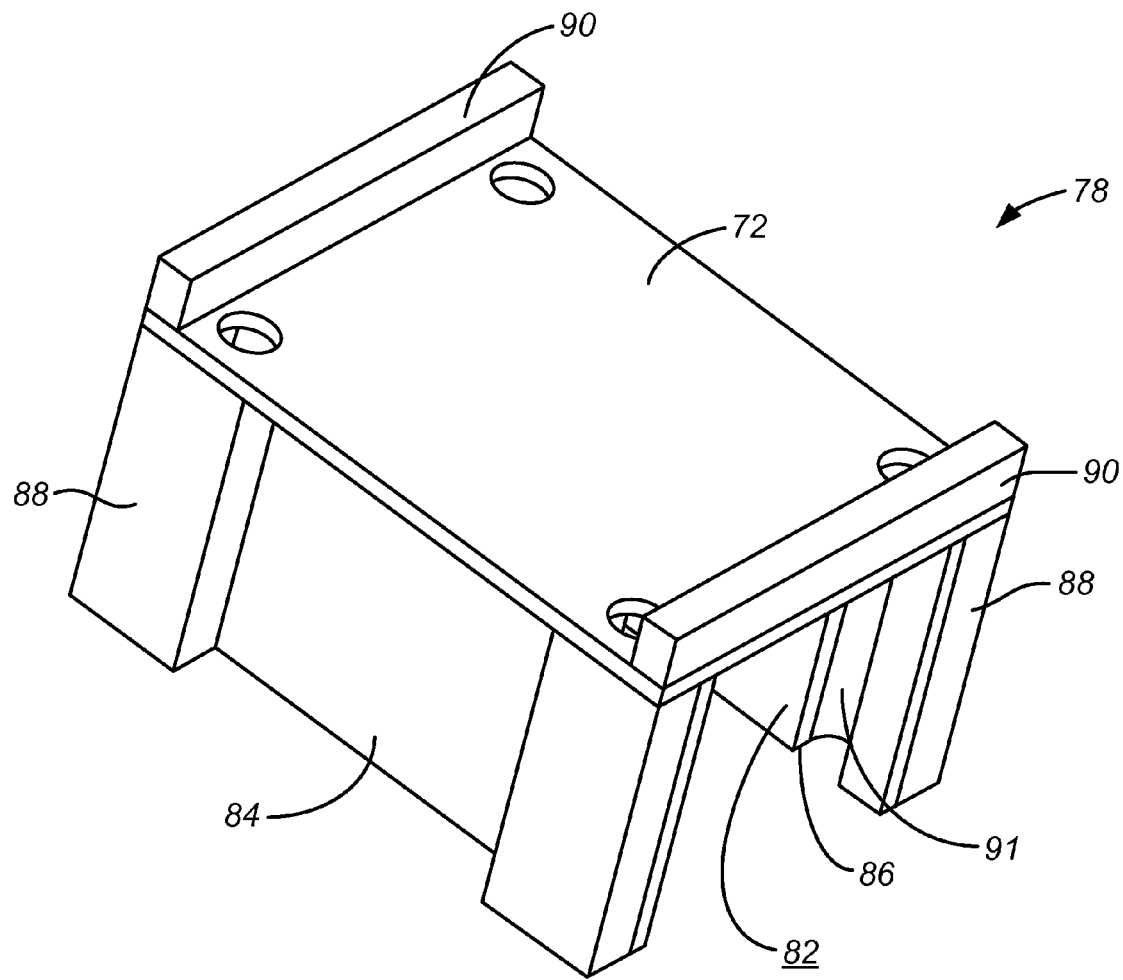
FIG. 5 is an enlarged view of the U-bracket of FIG. 4.

As shown in more detail in FIG. 5, U-bracket 78 comprises a top plate 72 and side plates 84, 86. Plates 70, 72, 84 and 86 define drive surface 82. It has been determined that it is desirable to strengthen U-bracket 78 at each open end of channel 80. In one possible embodiment this is accomplished by securing reinforcing flanges 88, 90 to top and side plates 72, 84, 86, typically by welding. However, this welding need not be done in the field. Instead of providing welded strengthening flanges, U-bracket 78 could be manufactured, for example, as a seamless unitary structure. Recessed slots 91 are provided at each end of channel 80 to allow fasteners 75 to pass therethrough.

In one possible embodiment channel 80 has a square cross-sectional shape to accommodate the square cross-sectional shape of drive shaft 24 and is slightly larger than drive shaft 24 so that drive surface 82 lies adjacent to driven surface 92 to permit a sliding fit therebetween. However, the height of side plates 84, 86 and reinforcing flanges 88 can be made so that a small gap is created between U-bracket 78 and plate 70 when fasteners 75 are tightened down. Fasteners 75 will then cause plates 70, 72 to press against the outer, driven surface 92 of drive shaft 24. Although the intimate contact provided by this contact helps to reduce relative movement between drive shaft enclosure 79 and drive shaft 24, it may not effectively prevent such movement under some loading conditions so that further strengthening is desirable for at least the exterior rows of solar collector assemblies 10.

Important aspects of the present invention, which strengthen the connection between drive shaft enclosure 79 and drive shaft 24, include strengthening drive shaft enclosure 79 at the open ends of channel 80, with one method for doing so discussed above with the use of flanges 88, 90, and constructing torque arm assembly 74 to prevent movement between drive shaft enclosure 79 and drive shaft 24 by providing contiguous abutment structure between each side of drive shaft 24 and drive shaft enclosure 79. This can be done in several ways, including the following.

Figure 6:
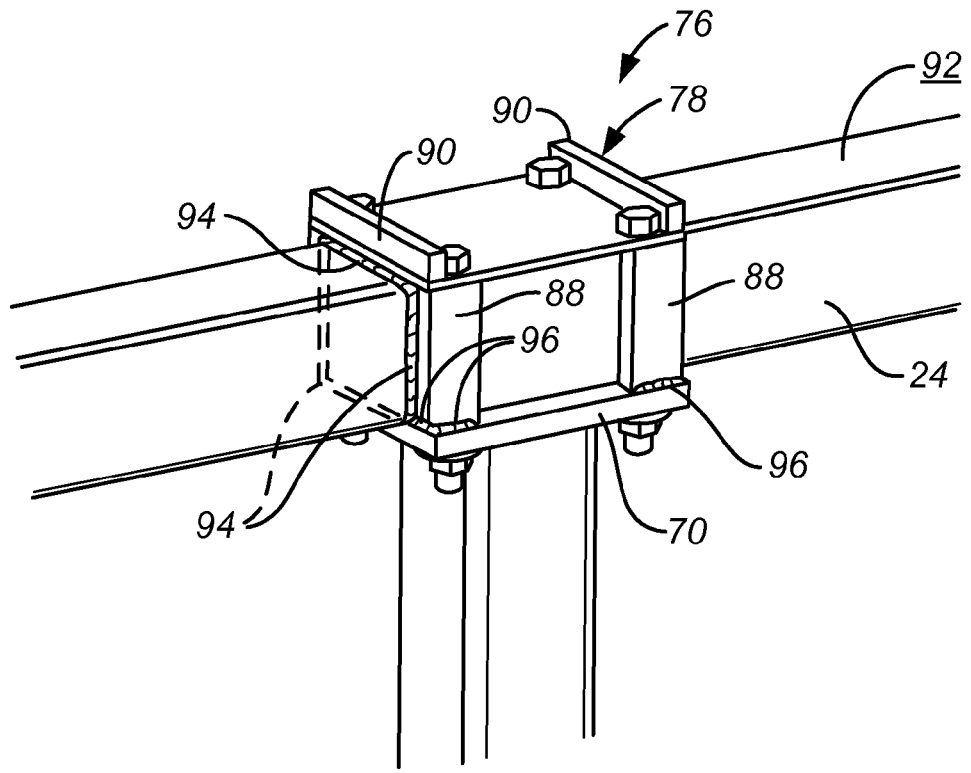
FIG. 6 is an enlarged view of a portion of the torque arm assembly of FIG. 2 showing the strengthening welds between the drive shaft enclosure and the drive shaft and between the flanges of the U-bracket and the bottom plate.

A preferred way of providing contiguous abutment structure, thus helping to prevent movement between drive shaft enclosure 79 and each side of drive shaft 24 is, as shown in FIG. 6, by welding drive shaft enclosure 79 to drive shaft 24. It is preferred that welds 94 extend along the entire circumferential intersection between drive shaft enclosure 79 at the open ends of channel 80 and the adjacent outer surface 92 of drive shaft 24. Although in the disclosed embodiments are welds 94 are continuous and have no gaps, something less than continuous welding may also suffice. However, it is expected that welds 94 will need to be along all four sides of drive shaft 24. Additional welds 96 are preferably made between portions of U-bracket 78 and plate 70 to help rigidify and strengthen drive shaft enclosure 79.

Figure 7:
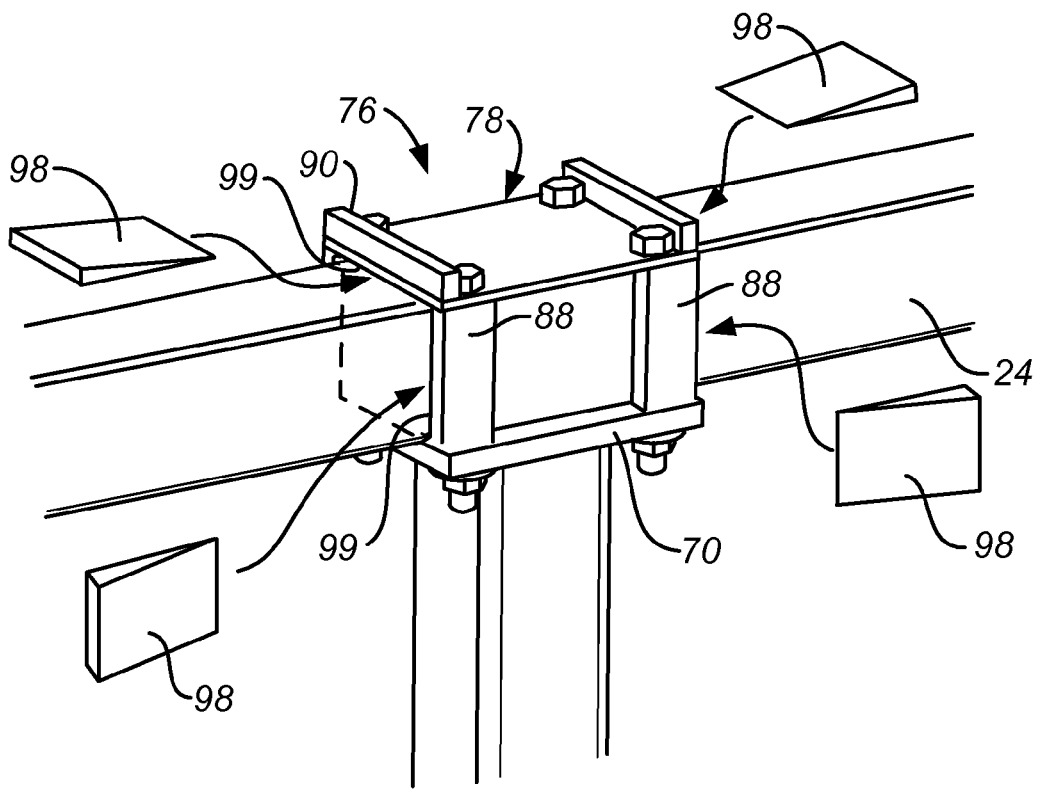
FIG. 7 is a view similar to that of FIG. 6 but illustrating the use of joint-strengthening shims between the drive shaft enclosure and the drive shaft.

Another way of providing contiguous abutment structure, thus preventing movement between drive shaft enclosure 79 and drive shaft 24, is illustrated in FIG. 7. Shims 98 are placed into the small gap 99 between outer surface 92 of drive shaft 24 and drive shaft enclosure 79 at adjacent sides of the drive shaft causing the opposite adjacent sides of drive shaft enclosure 79 to be biased towards the opposite adjacent sides of drive shaft 24. If desired, additional shims 98 could be used in gaps 99 along other sides of the structure. Instead of shims 98, another material, such as an initially flowable but hardenable material, for example an adhesive, can be placed into the small gaps 99. One way of doing so would be to inject the material through gaps 99 and/or through injection ports, not shown, provided at one or more of plates 70, 72, 84, 86. Another technique for providing contiguous abutment structure would be to provide what would effectively be an interference fit between drive shaft enclosure 79 and drive shaft 24 by, for example, heating drive shaft enclosure 79 prior to mounting onto drive shaft 24; in this example drive shaft enclosure 79 and drive shaft 24 would act as the contiguous abutment structure. More than one contiguous abutment structure can be used if necessary or desirable.

One of the advantages of torque arm coupler assembly 76 of FIGS. 2, 4 and 6 is that the initial assembly can be made using only fasteners 75. The welding or the insertion of shims or other material, for example, can be performed later and only on those rows expected to be subjected to loading conditions sufficient to warrant the extra strength provided by the continuous abutment structure.

Another advantage of torque arm coupler assembly 76 of FIGS. 2, 4 and 6 is that torque arm coupler assembly 76 is suitable for retrofit of solar collector assemblies that include the torque arm assemblies 74A of FIG. 3. To do so a kit including a U-bracket 78, and preferably new fasteners 75, is used. Before proceeding, torque tube 24 is typically prevented from rotating during the retrofit procedure by the use of a suitable fixture. Any overlying solar collector module 22 is removed. The existing fasteners 75 and top plate 72 are removed. U-bracket 78 is then mounted over torque tube 24 and secured in place using new fasteners 75. If welding is to take place, appropriate the heat protection coverings are used to protect adjacent solar collector modules 22 and any other heat sensitive items. If necessary or desirable, an additional bottom plate can be used between plate 70 and drive shaft 24. Such additional bottom plate can be oversized to help distribute the load. In addition, top plate 72, and with it side plates 84, 86, of U-bracket 78 can be made larger than plate 70 for improved load distribution. After installation any heat protection coverings are removed, any previously removed solar collector module are reinstalled, and any anti-rotating fixtures are removed.

The above descriptions may have used terms such as above, below, top, bottom, over, under, et cetera. These terms are used to aid understanding of the invention are not used in a limiting sense. The directions north and south have been used assuming the installation site is in the Northern Hemisphere. The more generic terms polar for north and equator or equatorial for south can be used to cover installation sites in both the Northern Hemisphere and the Southern Hemisphere.

Modification and variation can be made to the disclosed embodiments without departing from the subject of the invention. For example, torque member 24 may have a variety of cross-sectional shapes including round, elliptical, hexagonal and square, may have a partially or fully solid interior, may be made of one or more materials, and may have its various structural features vary along its length. The solar collector support structure could be mounted so to tilt not about a fixed tilt axis 42 but, for example, about a range of instantaneous tilt axes.

Any and all patents, patent applications and printed publications referred to above are incorporated by reference.

The invention claimed is:

1. A torque arm assembly of a solar collector installation of the type comprising a solar collector mounted to a drive shaft which defines an outer surface, the torque arm assembly comprising:
a torque arm having first and second ends; and
a torque arm coupling assembly comprising;
a first part; and
a second part securable to the first part to define a drive shaft enclosure, the drive shaft enclosure secured to the first end of the torque arm;
wherein the drive shaft enclosure defines an open-ended passage sized to house the drive shaft and to define a drive surface therebetween so the drive shaft and the drive shaft enclosure rotate together; and
wherein the second part comprises a U-bracket having a U-shaped central portion and U-shaped end portions, the U-shaped end portions being thicker than the U-shaped central portion and thereby providing additional strength at the end portions.

2. The assembly according to claim 1, wherein the second part is securable to the first part by threaded fasteners.

3. The assembly according to claim 1, wherein the drive shaft and the drive shaft enclosure are coupled by biasing portions surrounding the drive shaft against adjacent sides of the drive shaft.

4. The assembly according to claim 1, further comprising a contiguous abutment structure connecting each side of the drive shaft to the drive shaft enclosure.

5. The assembly according to claim 4, wherein the contiguous abutment structure comprises weld lines placed along portions of the drive shaft enclosure and the drive shaft.

6. The assembly according to claim 4, wherein the contiguous abutment structure comprises shims located between the drive shaft enclosure and the drive shaft.

7. The assembly according to claim 4, wherein the contiguous abutment structure comprises an adhesive located between the drive shaft enclosure and a drive shaft.

8. The assembly according to claim 1, wherein the passage is a rectangular channel having a length and a first and second transverse dimensions, the length being greater than each of the first and second transverse dimensions.

9. A torque arm assembly of a solar collector installation of the type comprising a solar collector mounted to a drive shaft, the torque arm assembly comprising:
a torque arm having first and second ends; and
a torque arm coupling assembly disposed at the first end of the torque arm, the torque arm coupling assembly comprising;
a central portion extending in a longitudinal direction and having a longitudinal axis, the central portion being sized so that the longitudinal axis can be generally aligned with a longitudinal axis of the drive shaft, the central portion having an outer surface and including a first end and a second end;
a first flange fixed at the first end and extending at least partially around the outer surface of the central portion, the first flange extending beyond the outer surface of the central portion in a radially outward direction relative to the longitudinal axis of the central portion; and
a second flange fixed at the second end and extending at least partially around the outer surface of the central portion, the second flange extending beyond the outer surface of the central portion in a radially outward direction relative to the longitudinal axis of the central portion.

10. The assembly according to claim 9 additionally comprising threaded fasteners extending through the first and second flanges for securing the torque arm coupling assembly to the drive shaft.

11. The assembly according to claim 9 additionally comprising first and second plate members extending to the second end of the torque arm and being spaced from each other in the longitudinal direction, wherein the first plate member extends generally parallel to the first flange and the second plate member extends generally parallel to the second flange.

12. The assembly according to claim 9, wherein an uppermost surface of the first and second flanges are flat.

13. The assembly according to claim 9, wherein the central portion, the first end and the second end are open and sized such that the drive shaft can extend through an entire length of the central portion and the first and second open ends.

14. The assembly according to claim 9, wherein the first and second flanges extend around more than half of the outer surface of the central portion.

15. The assembly according to claim 9, wherein the first flange, the second flange and at least a part of the central portion are formed in a u-shaped member sized to fit around three sides of the drive shaft, the drive shaft having a rectangular cross section.

16. A solar collector system comprising:
 a solar collector supported by a drive shaft, the drive shaft having a longitudinal axis;
 a torque arm having first and second ends; and
 a torque arm coupling assembly disposed at the first end of the torque arm and connecting the torque arm to the drive shaft, the torque arm coupling assembly comprising;
  a central portion extending in a longitudinal direction and having a longitudinal axis, the central portion being sized so that the longitudinal axis of the central portion is generally aligned with a longitudinal axis of the drive shaft, the central portion having an outer surface and including a first end and a second end;
  a first flange fixed at the first end and extending at least partially around the outer surface of the central portion, the first flange extending beyond the outer surface of the central portion in a radially outward direction relative to the longitudinal axis of the central portion; and
  a second flange fixed at the second end and extending at least partially around the outer surface of the central portion, the second flange extending beyond the outer surface of the central portion in a radially outward direction relative to the longitudinal axis of the central portion.

17. The assembly according to claim 16 additionally comprising threaded fasteners extending through the first and second flanges for securing the torque arm coupling assembly to the drive shaft.

18. The assembly according to claim 16 additionally comprising a drive strut connected to the second end of the torque arm and a driver connected to the drive strut so as to move the drive strut through reciprocating movement, the torque arm being connected to the drive strut so as to pivot the torque arm as the drive strut moves through the reciprocating movement.

19. The assembly according to claim 16, wherein an uppermost surface of the first and second flanges are flat.

20. The assembly according to claim 16, wherein the central portion, the first end and the second end are open and sized such that the drive shaft can extend through an entire length of the central portion and the first and second open ends.

* * * * *